US011939192B2

(12) United States Patent
Kristensen et al.

(10) Patent No.: US 11,939,192 B2
(45) Date of Patent: Mar. 26, 2024

(54) COMBINATION COMPRISING A CRANE AND A LOAD GUIDING ARRANGEMENT ARRANGED FOR MOUNTING TO THE CRANE AND USE OF A LOAD GUIDING ARRANGEMENT IN SUCH COMBINATION

(71) Applicant: ENABL A/S, Hedensted (DK)

(72) Inventors: Claus Dahl Kristensen, Sommersted (DK); Henrik Barsballe, Kolding (DK)

(73) Assignee: ENABL A/S, Hedensted (DK)

( * ) Notice: Subject to any disclaimer, the term of this patent is extended or adjusted under 35 U.S.C. 154(b) by 0 days.

(21) Appl. No.: 17/640,106

(22) PCT Filed: Sep. 10, 2020

(86) PCT No.: PCT/DK2020/050247
§ 371 (c)(1),
(2) Date: Mar. 3, 2022

(87) PCT Pub. No.: WO2021/047745
PCT Pub. Date: Mar. 18, 2021

(65) Prior Publication Data
US 2022/0297981 A1   Sep. 22, 2022

(30) Foreign Application Priority Data
Sep. 11, 2019 (DK) .......................... PA 2019 70565

(51) Int. Cl.
*B66C 13/08* (2006.01)
*B66C 23/18* (2006.01)
*B66C 23/36* (2006.01)

(52) U.S. Cl.
CPC ............ *B66C 13/08* (2013.01); *B66C 23/185* (2013.01); *B66C 23/36* (2013.01)

(58) Field of Classification Search
CPC ........... B66C 1/10; B66C 1/108; B66C 13/04; B66C 13/06; B66C 13/08; B66C 13/10;
(Continued)

(56) References Cited

U.S. PATENT DOCUMENTS 9,394,146 B2 *   7/2016   Schroder ................. B66C 23/62
2012/0061341 A1   3/2012   Richter
(Continued)

FOREIGN PATENT DOCUMENTS

CN         203612833 U        5/2014
CN         113651250 A  *    11/2021
(Continued)

OTHER PUBLICATIONS

International Search Report for PCT/DK2020/050247 dated Dec. 10, 2020.
Written Opinion for PCT/DK2020/050247 dated Dec. 10, 2020.

*Primary Examiner* — Michael R Mansen
*Assistant Examiner* — Henrix Soto
(74) *Attorney, Agent, or Firm* — Schmeiser, Olsen & Watts, LLP

(57) ABSTRACT

A combination including a crane and a load guiding arrangement arranged for mounting to the crane for controlling the orientation of a load suspended in a crane boom from a bearing wire about the bearing wire is provided. The load guiding arrangement includes: —two winches placed on the crane, —two taglines connected with the winches and two attachment brackets attached in a top zone of the crane boom and being connected to the load for applying a controlled torque to the load about the bearing wire. The load guiding arrangement furthermore includes: —for each winch a winch frame, which is arranged for mounting directly on the crane next to or on the crane counterweight in positions at each side of the crane and —two tagline redirection devices, for example snatch blocks which are connected with the load.

10 Claims, 7 Drawing Sheets

(58) Field of Classification Search
CPC ..... B66C 23/185; B66C 23/207; B66C 23/62;
B66C 23/36; B66C 23/00; B66C 23/72;
B66C 2700/085; F03D 13/10; F03D
13/20; F03D 13/25; F03D 13/40; F05B
2230/60; F05B 2230/604; F05B 2230/61;
Y02E 10/72; Y02E 10/728
USPC .......................................................... 212/195
See application file for complete search history.

(56) References Cited

U.S. PATENT DOCUMENTS

| | | | |
|---|---|---|---|
| 2015/0083887 A1* | 3/2015 | Mohr | B66C 23/62 |
| | | | 212/175 |
| 2016/0002010 A1 | 1/2016 | May | |
| 2016/0280517 A1* | 9/2016 | Oelberger | B66C 23/76 |

FOREIGN PATENT DOCUMENTS

| | | | | |
|---|---|---|---|---|
| DE | 102009058268 A1 * | 6/2011 | ............. | B66C 23/18 |
| DE | 10 2014 013953 A1 | 3/2016 | | |
| EP | 2 889 251 A1 | 7/2015 | | |
| FR | 2926805 A1 * | 7/2009 | ............. | B66C 13/04 |
| JP | H04266397 A * | 9/1992 | | |
| JP | H06 156975 A | 6/1994 | | |
| WO | 2008/061797 A1 | 5/2008 | | |
| WO | 2011088832 A1 | 7/2011 | | |
| WO | WO-2011088832 A1 * | 7/2011 | ............. | B66C 13/08 |
| WO | 2014/082641 A1 | 6/2014 | | |
| WO | WO-2015165463 A1 * | 11/2015 | ............. | B66C 1/108 |
| WO | 2018/228810 A1 | 12/2018 | | |

* cited by examiner

COMBINATION COMPRISING A CRANE AND A LOAD GUIDING ARRANGEMENT ARRANGED FOR MOUNTING TO THE CRANE AND USE OF A LOAD GUIDING ARRANGEMENT IN SUCH COMBINATION

CROSS-REFERENCE TO RELATED APPLICATIONS

This application claims priority to PCT Application No. PCT/DK2020/050247, having a filing date of Sep. 10, 2020, which is based DK Application No. PA 2019 70565, having a filing date of Sep. 11, 2019, the entire contents both of which are hereby incorporated by reference.

FIELD OF TECHNOLOGY

The following relates to a combination comprising a crane and a load guiding arrangement arranged for mounting to the crane, which comprises a crane boom and which load guiding arrangement is arranged for controlling the orientation of a load suspended in a crane boom from a bearing wire about said bearing wire, which combination comprises:
- two winches, each of the winches has a bi-directional rotational spool, wherein the winches are placed on the crane,
- two taglines with a first end of the tagline attached to the spool, wherein each tagline is connected to the load for applying a controlled torque to the load about the bearing wire,
- two attachment brackets attached to the crane boom in an attachment position in a top zone of the crane boom, each attachment bracket is arranged for attachment to a second end of the tagline and
- two tagline redirection means or devices, for example snatch blocks which are connected with the load, wherein the redirection means or devices allow the tagline to roll or slide around the redirection means or devices while the load is raised or lowered and simultaneously provides for a redirection of the tagline, whereby each tagline is connected with the load through the redirection means or devices so that each tagline extend from the spool to the attachment bracket via the redirection means or devices.

Furthermore, embodiments of the invention relate to use of a load guiding arrangement in such combination.

The winches may be controlled by a control unit or be manually controlled.

In the present application the term tagline is used for an elongate connection means connected between the load and a winch for transferring a force from the winch to the load. The tagline may be a rope, a cable, a wire or another tether. The tagline is able to transfer tension forces.

BACKGROUND

When lifting loads of a substantial size it is a requirement that the orientation of the load is controlled. Examples of such loads may be wind turbine blades, towers, prefabricated concrete elements for buildings, etc.

Due to the inertia of the load the load may maintain its position in space even when the bearing wire is rotated, i.e., if the crane boom is rotated. Therefore, an uncontrolled load may potentially impact the crane boom or impact personnel, or structures close by. It is therefore a requirement that the load is controlled. This is effected by attaching a tagline to the load for applying a torque to the load about the bearing wire. The torque may be clockwise or counter-clockwise.

Due to the size of the loads, it is unsafe for personnel to handle the taglines and to apply the torque to the load about the bearing wire.

There is a need on the onshore wind turbine market to be able to control the load beneath the crane hook and it has not diminished as the wind turbines have become higher and the site placements are becoming more and more complex.

There are several different tagline systems with different effects on the crane.

There is a desire to meet the wind turbine market in order to be able to control the load and at the same time to bring the forces to a minimum into the crane and minimize mobilization time.

From WO 2008/061797 a method and a lifting device for mounting a wind turbine blade to a wind turbine hub are known. The blade is suspended in a substantially horizontal orientation from a bearing wire provided by a crane having a crane boom. The bearing wire is attached to the lifting device, which is attached to the blade. The blade is lifted from a position on the ground and to a position, where the blade may be mounted to the hub. In order to avoid that the blade rotates about the bearing wire the blade is connected to control wires, which run via pulleys on the crane boom to a winch arrangement at the bottom of the crane boom. The system applies one winch for controlling the orientation of the load and another manually operated winch for rotating the load.

Although the system of WO 2008/061797 has been successfully implemented there are some disadvantages of the system. A major disadvantage is that the crane needs to be modified. This normally requires approving from the crane manufacturer in order to guarantee the required functioning of the crane. The cranes are very expensive to operate and are only used for a short duration. A purpose modified crane would have much idle time, alternatively the pulleys, the winch arrangement and the control wires would have to be removed from the system of WO 2008/061797 between lifting operations at one site to free the crane for other uses.

EP 2 889 251 also disclose a system for guiding the load. Also, this system requires the modification of the crane and need for guidewires and control wire which are attached to the crane boom.

In order to solve the disadvantage of modifying the crane EP 2 526 042 discloses a system in which the winch arrangement for controlling the orientation of a load suspended from the bearing wire in relation to the bearing wire, and which provide flexibility concerning the placement of the winch arrangement, such that it does not require to be installed on a crane.

Furthermore EP 2 526 042 disclose a system in which it is achieved that the orientation of the load about the bearing wire is maintained autonomously without the need for user input apart from activating the winch arrangement.

The load is suspended from a bearing wire provided by a crane. When the crane operator manipulates the load, the winch arrangement will maintain the orientation by applying a controlled torque about the bearing wire. This may be effected, based on the tension sensor measurements handled in a control unit or be a manually control which may be based on tension sensor measurements or other measurements indicating a rotation about the bearing wire. The crane operator may therefore fully concentrate on positioning of the load according to height, while operating the crane boom and/or a bearing wire winch, without having to operate a further winch for maintaining the orientation of the load about the bearing wire.

The tagline runs directly from the winch to the load or from the winch to a land. Therefore, the method and winch arrangement is flexible regarding placement of the winch arrangement. For example, the winch arrangement may be placed on the ground, on the crane or on the load.

This system has been successfully implemented. However, it has shown that it is possible to obtain a system which is even more technically simple and in which it is possible to benefit of the advantages of the method for controlling the orientation of the load according to the method disclosed in EP 2 526 042. Furthermore, it has shown that such system may be provided which ensures that the crane needs not to be modified in a way requiring special approvals.

Moreover EP 2 889 251 A1 disclose a load guiding arrangement suitable for mounting to a crane. The load guiding arrangement is of the type described by way of introduction. D1 does not disclose a crane counterweight and accordingly there is no disclosure of mounting the load guiding arrangement next to a crane counterweight.

SUMMARY

An aspect relates to a combination comprising a crane and a load guiding arrangement arranged for mounting to the crane which provide a technically simple load guiding arrangement to be placed on the crane without the need of modifying the crane.

A further aspect is to provide a load guiding arrangement which may also make is possible to benefit of the advantages of the method for controlling the orientation of the load according to the method disclosed in EP 2 526 042.

According to embodiments of the present invention, this aspect is achieved by a combination mentioned by way of introduction, and which furthermore comprises:
 a crane counterweight and
 for each winch a winch frame, which is arranged for mounting directly on the crane next to or on the crane counterweight in positions at each side of the crane.

This new combination meets the requirement of wind turbine market as it is able to control the load and at the same time it brings the forces to a minimum into the crane and the crane boom and minimizes mobilization time.

The combination according to embodiments of the invention has more advantages:
 is very simple,
 is very easy to install on the crane,
 will not limit the crane by adding many forces into the crane boom,
 can be used on many crane types,
 will secure a good control for the lifted load, both horizontal and vertical control,
 will follow the crane movement,
 can be used for sites with limited space and
 no construction changes for the crane are needed.

The forces acting on the crane boom are reduced to tagline forces alone. The tagline is attached on the crane boom at the top of the crane boom. This will reduce the torsion forces compared to conventional art systems. Therefore, the combination according to embodiments of the invention will not limit the crane by adding many forces into the crane boom. The taglines may be attached directly on the crane boom or indirectly through traverses or spacers.

The top zone of the crane boom may typically comprise the uppermost ⅓ of the height of the crane boom. However, the advantages of embodiments of the present invention will also be obtained with the two attachment brackets attached to the crane boom in a position in a top zone comprised by the uppermost ½ of the height of the crane boom. What is important is to have the two attachment brackets attached to the crane boom at a height where the best control of the load in a horizontal plane is desired.

With the combination according to embodiments of the invention the mobilization consists of two tagline winches and possible one power generator and a control cabinet. A guide wire system as used in conventional art systems is removed which easy the mobilization time and will also improve the super lift because the top traverse is no longer a burden in the top of the boom.

Therefore, the load guiding arrangement is very simple and very easy to install on the crane and may be used on many crane types. All parts may be made for handling with trucks, cherry picker, hand or crane.

The mobilization process may only involve the following steps:
 The winch (TGM) system on counter-weight is stored and transported on flatbed or in a container with the tagline arranged on the spool of the winch.
 One winch and one counter-weight block are attached to a winch frame and lifted on top of the counterweights rack at each side of the crane boom.
 At least one extra counterweight block is placed on the winch frame.
 The power generator is lifted on the walkway (provided that there is used a separate power generator).
 The power cables are connected to winches.
 The second tagline end is attached to attachment brackets which are positioned in the top zone of the crane boom in a position approximately corresponding to the turbine hub level.
 After super lift the tagline is payed out to attach to the snatch block (or the like) on the load.

In praxis the load guiding arrangement may be used in combination with the method disclosed in EP 2 526 042. This is also known as the TGM system. Two TGM winches are placed next to the crane counterweight and the power generator may be placed on the walkway near the counterweight blocks.

The second tagline end is fixed in the top zone of the crane boom with use the attachment bracket.

The attachments bracket may be connected to a boom pin joint or to a tubing of the crane boom.

Alternatively, the attachment bracket may be connected to the crane boom through a traverse or a spacer. The attachment bracket may comprise a connection eye or other suitable means for fixing the second end of the tagline to the crane boom in the top zone of the crane boom.

The load is connected with the taglines in a position between the winch and the attachment bracket via a snatch block or other redirection means which may roll or slide in relation to the tagline.

Hereby the taglines support and control the orientation of the load as explained in detail below.

The tagline runs directly from the winch via the load to the attachment bracket.

The placement of the tagline winches is provided in a position in which installation is easy and fast.

The winch may be an electronic driven winch or a hydraulic driven winch.

The winches are placed on the crane on each side of the crane boom and so they will follow the crane movement when the crane is moving inclusive yawing. The winch frame may be designed in such way that it fit to the crane, e.g., it may be designed to be placed directly on the crane counterweight whereby the crane needs no modification for mounting the winch frame.

By using the winch frame, it is possible, when assembling the crane on a site where it shall be used, to place the winch frame on the rack for the crane counterweight. The crane counterweight blocks will be lifted free from the crane during transport and be mounted when the crane is assembled on the site where the crane is to be used. Accordingly, the combination does not need specific crane approvals as the winch frame and the winch placed on the crane may be considered to be a part of the crane counterweight. It is noted that a crane approval is needed, however it is expected that an approval may be obtained as a type approval, whereby different types of cranes will be approved to the load guiding arrangement according to embodiments of the invention.

Moreover, the winches may be placed on the crane as a part of the normal routine for mounting the counterweight blocks.

A counterweight block normally has a weight between 8 and 15 tons. Typically, 20 counterweight blocks or more are used. The winch used will typically have a weight between 3 and 5 tons. The winch will only contribute to the weight in very limited size. Accordingly, the weight of the winch may be negligible and thus reduce or totally eliminate the need for specific crane approvals.

The winch frame needs not to be mounted with screws to the crane. It may be kept on place by the weight of the crane counterweight.

Alternatively, it is also possible to produce a frame which is welded to the crane and therefore may constitute a part of the crane, and which will be used for the mounting of the winch.

A generator/power supply for the winches can be placed on the crane's service platform or on the winch frames.

The power supply for the winches may alternatively be delivered from the crane and may be electrical or hydraulic power supply.

The attachment brackets may be clamped onto the structure of the crane boom. Accordingly, there is no need to modify the crane boom.

When modifying the crane boom by screwing something into the boom there is a need specific crane approval. This is not necessary with the attachment brackets, cf. comments above regarding crane approval.

The crane boom in itself has strength in the longitudinal direction; however, the crane boom is not suited for twisting movements or torsional movements.

By using attachment brackets which are clamped the structure of the crane boom there is no need to bolt elements into the crane boom. Hereby there is no need for specific crane approval, cf. comments above regarding crane approval.

By this mounting of the attachment brackets the load on the crane boom will be arranged at the top of the crane in a position in the crane boom itself, whereby very small or no twisting or torsional forces will occur.

The placement of the attachment brackets/fixing point for the tagline to the crane boom is important.

The attachment bracket has to be in a height close to the heights where the main control is needed for the load. For blade installation these heights are within a range of some meters over or below hub heights.

This will give the best angle for an upper part of the tagline which is arranged between the redirection means and the attachment bracket to stabilize the lifted burden in horizontal direction and the best angle for a lower part tagline which is arranged between the redirection means and the winch to stabilize the lifted burden in vertical direction.

The position of the attachment bracket for attaching the tagline to the crane boom is important.

The position of the attachment point can be provided to the crane boom in different ways: on each side of the crane boom, to a top traverse or to a single guide wire.

The best control is given when a certain distance between the two attachment brackets is provided. Often the connection points at the load to be lifted is spaced apart by 8-20 meter, and if the tagline is connected to attachment brackets being spaced between 4-12 meter this gives the good control of the load.

The taglines are connected with but not fixed to the load. The redirection means allow the taglines to move freely either by sliding or rolling around an element of the redirection means.

The taglines are fixed to the spools and the attachment brackets only and there is no need for guidewires or control wire which are necessary in the system disclosed in WO 2008/061797 and in EP 2 889 251.

The taglines will be fixed to the spools and the attachment brackets. The redirection means are connected with the load and fixed thereon.

The load which due to gravity will hang down from the top of the crane where the bearing wire is mounted will have a force directed outwardly towards the redirection means on the load to each side of the crane boom. Moreover, a force will be exerted in direction from the load towards the crane boom which is arranged under an oblique angle corresponding to the vertical direction.

Accordingly, forces will be exerted in vertical direction and horizontal direction by the action of the taglines when the spools are rotated.

Furthermore, the oblique angle from the attachment brackets at the crane boom to the redirection means on each side on the crane boom will exert forces in a horizontal plane. Accordingly, it is possible for the crane operator to manipulate the load by applying a controlled torque about the bearing wire. The control system may be working according to the principles disclosed in EP 2 526 042.

Accordingly, a tension sensor may be used for measuring the tension occurring in the taglines.

These measurements may be treated in the control unit in order to activate a motor in the winch and thereby activate the rotation of the rotation spool.

In other word the system may be operated as follows. The tagline is applying a torque about the bearing wire to the load. The tagline is flexible, so the tagline is in tension. The tagline force is tree-dimensional with two perpendicular horizontal components and a vertical component (z-component). One of the horizontal components (x-component) is directed from the redirection means on the load towards the bearing wire and the other (y-component) from the redirection means and perpendicular to the x-component. The controlled torque about the bearing wire is applied in a horizontal plane. The torque is composed by the y-component of the tagline force and the distance to the bearing wire (moment arm). The winch is located sufficiently far from the load in the direction of the y-component to apply the necessary torque to control the load. The necessary distance is dependent of how much tagline force the winch is rated at, the moment of inertia of the load, the distance between the redirection means and the bearing wire, the maximum lifting height and external forces ex the wind forces.

The relative relationship between the distance between the winch and the load is as follows; a relatively long distance allows for a lower tagline force, a higher moment of inertia, a shorter moment arm, a higher maximum lifting height and/or higher external forces, whereas a winch located closer to the load needs a higher rating, less moment of inertia, a longer moment arm, a lower maximum lifting height and/or lower external forces.

The winches are arranged on opposite sides of the crane boom and thus on opposite sides of the bearing wire. The winches are arranged such that they apply opposite directed torque to the load. For example; a first winch applies a clockwise torque, and a second winch applies a counter-clockwise torque; the first winch applies a counter-clockwise torque, and the second winch applies a clockwise torque. When the sum of torque applied by the winches equal zero the load will maintain its orientation about the bearing wire.

The first and second winches may be located with an equal moment arm and symmetrical position in relation to the bearing wire or a different moment arm and an asymmetrical position in relation to the bearing wire. The control system is able to compensate during controlling of motors of the winches.

The load guiding arrangement is typically used for controlling the orientation of a load of substantial size and/or weight suspended from a bearing wire about the bearing wire. Examples of such loads may be wind turbine blades, towers, prefabricated concrete elements for buildings, etc. or other load with a large moment of inertia.

The load may be suspended from a crane with a bearing wire. The bearing wire may have an attachment means for connection to the load or a lifting frame attached to the load. For example, the attachment means may be a hook.

Each winch may have a hydraulically or electrically driven winch motor driving the spool. The spool is able to rotate bi-directional either by a gearing or bi-directional rotation of the winch motor. The tagline, which may be a wire, cable or a rope, is wound around the spool. The tagline is provided with attachment means for attachment to the attachment bracket.

A control system is provided for controlling the operation of the winch motors. The winch motors may operate simultaneously with the same or dissimilar rotation speeds. Thus, the winch motors may operate individually. The control system comprises tension sensor means for determining the tension in the taglines and spool rotation sensor means for determining the position and the operation of the spool. The sensors are operating continuously during use of the system to provide feedback of the operation to the control system.

The control system may be provided with an output means for providing the sensor measurements to the crane operator or a data logger. Furthermore, the control system may be provided with warning signals provided to the crane operator, when pre-set limits are about to be-/are exceeded. This will enable the crane operator to interrupt the lifting and bring the load into a safe condition if for example the wind conditions change and exceeds a predefined limit.

In a further embodiment the combination according to the invention is peculiar in that each attachment bracket comprises an attachment clamp which is mounted directly to the crane boom by clamping two clamp parts onto a crane boom lattice part.

When using attachment clamp for attaching the attachment brackets, then it is possible to mount the attachment clamp directly to tubes constituting a part of the crane boom lattice. Hereby there is no need for any interference into the crane boom, e.g., when two claim parts which are clamped around the lattice part are used there will be a technically simple solution for an attachment requiring no specific crane approval.

In a further embodiment the combination according to the invention is peculiar in that the attachment brackets are mounted at opposite ends of a traverse which is attached to the crane boom.

In order to obtain a larger distance between attachment brackets a traverse could be used. The traverse will be attached to the crane boom. For attachment of the traverse to the crane boom there could also be used attachment clamps which may be in a two-part form. Hereby it is possible to clamp the traverse to the lattice part of the crane boom without changing the structure of the crane boom itself. This is a technically simple solution to obtain a wider distance between the attachment brackets and may be installed without specific crane approval, cf. comments above regarding crane approval.

In a further embodiment the combination according to the invention is peculiar in that each winch frame is designed with a form corresponding to the form of counterweight blocks and is attached to the crane counterweight in a position between the counterweight blocks.

Alternatively, the winch frame may be embodied in other ways. The winch plate may be embodied in a way which makes it possible to attach the winch plate in or at the counterweight, e.g., on top of the stack of the counterweight blocks.

The most convenient way to provide the winch frame is to have a form corresponding to the form of the counterweight blocks. Hereby it is very simple to mount the winch as the winch frame is inserted in the stack of counterweight blocks. In an embodiment, the winch frame will be mounted with one or more counterweight blocks on top of the winch frame. Hereby the winch frame may be mounted in the stack of counterweight blocks without specific connection means.

Accordingly, the winch frame may be mounted to the crane without any specific means except for the means used for mounting the counterweight blocks.

In a further embodiment the combination according to the invention is peculiar in that the tagline redirection means are chosen between snatch blocks, connection eyes, shaft connections, roll connections or the like elements allowing the tagline to roll or slide around the redirection means during raising or lowering the load.

The redirection means will be a snatch blocks which allow for a freely rotation and which will allow the tagline to be connected to the load and simultaneously have a redirection which is necessary due to the configuration of the crane boom. The crane boom is normally placed in an oblique condition in relation to a vertical orientation and the bearing wire will orient due to gravity influencing on the load have a vertical orientation. However, this vertical orientation will be slightly amended due to the forces exerted on the load.

When the taglines are used for controlling the load there will be exerted a pull towards the crane boom whereby the bearing wire will have a small degree deviating from a vertical orientation.

The redirection means may also be provided in form of connecting eyes or shaft connections which allow the tagline to slide freely through the redirection means upon the actions effected when the load is raised or lowered. Hereby the taglines control the orientation and simultaneously will be guiding the load due to the connection between the taglines and the redirection means.

In a further embodiment the combination according to the invention is peculiar in that the attachment position is arranged at a position lower than a top position of the crane boom whereby the load may be raised to a position above the attachment position.

The position for the attachment brackets will be in an attachment position lower than the top position of the crane boom. Accordingly, the load may be raised to a position above the attachment position.

In general, the connection position should be in a height which is chosen according to the height where the main control is needed for the load. When installing blade in wind turbines the position would be in a height corresponding to the height of the hub of the wind turbine.

In general, it is desirable that the redirection means are arranged at the lower side of the load.

However, redirection means may also be arranged at the upper side of the load.

When having the redirection means arranged at a lower side of the load there is less requirements for the height of the crane boom.

In a further embodiment the combination according to the invention is peculiar in that it furthermore comprises a yoke for supporting the load and that the two tagline redirection means are connected with the load via the yoke.

The redirection means need not to be connected directly to the load. The redirection means could be indirectly connected with the load via a yoke. In this embodiment it is possible to use traditional yokes which will normally be used when installing blades in wind turbines.

In a further embodiment the combination according to the invention is peculiar in that the mutual distance between the two tagline redirection means is larger than the mutual distance between the two winches.

Due to a relatively large distance between the winch and the load the two taglines between the tagline redirection means and the winches are arranged with a relatively small mutual angle, e.g., between 20° and 30°.

The size of the angle is not important; however, it will provide a small control of the movement of the load in a direction being transversal to the direction directed against the crane boom.

What is of more importance is the distance between the attachment means arranged at the load.

Especially in a lower zone of the crane boom it is advantageous to have a long distance between the attachment means as a high horizontal control is obtained.

A longer distance between the attachment means provides for more stability/control as the product of force and distance is influencing on the control of the load.

In a mid-zone of the crane boom, it is also advantageous to have a long distance between the attachment means as a high horizontal control is obtained. In the mid zone a horizontal control of the load is obtained which is lower than the control in the lower zone.

In a top zone where the load is arranged at a height close to the height of the attachment brackets an angle between a tagline and an imaginary line connection the two redirection means—as measured between the tagline redirection means and the attachment brackets and the imaginary line connection the two redirection means—may not be too small. A small angle will cause that a relatively small horizontal force is obtained in direction against the crane boom and a relatively large force is obtained in the transversal direction, which typically is in the longitudinally direction of the load.

Therefore, small angles may give risk of instability. Typically, the angle should be larger than 20° and desirably larger than 30°.

The angle between a tagline and the vertical will typically be small. Accordingly, the forces acting in the tagline between the winch and the redirection means will only contribute very limited to the control in horizontal plane. However, these forces will provide a vertical control.

The best control with the load is obtained when there is a certain distance between the redirection means which is larger than the distance between the two winches arranged on the crane.

Moreover, the mutual distance between the two tagline redirection means is larger than the mutual distance between the two attachment brackets.

In a further embodiment the combination according to the invention is peculiar in that the mutual distance between the two tagline redirection means is between 8 and 20 m and that the mutual distance between the two winches is between 4 and 12 m.

When using the combination for installation of blades in wind turbines a normal distance between the redirection means is between 8 and 20 m. For such distance it has shown that the mutual distance between the two winches should be between 4 and 12 m. Here it should be remembered that also the above-mentioned mutual angle should be observed and that such mutual angle is obtained when having the mutual distances between the redirection means and the winches, respectively.

In a further embodiment the combination according to the invention is peculiar in that the combination comprises a control system and that the winches are controlled by the control system.

The combination may comprise a control system. The control system may be of the type known from EP 2 526 042. The benefit of such control system is explained in the patent and accordingly, a specific explanation is not given here. The content of EP 2 526 042 is hereby incorporated by reference.

BRIEF DESCRIPTION

Some of the embodiments will be described in detail, with references to the following Figures, wherein like designations denote like members, wherein.

DETAILED DESCRIPTION

In the following corresponding or like features will have the same reference number and each feature will not be explained fully in connection with each Figure.

Figure 1:
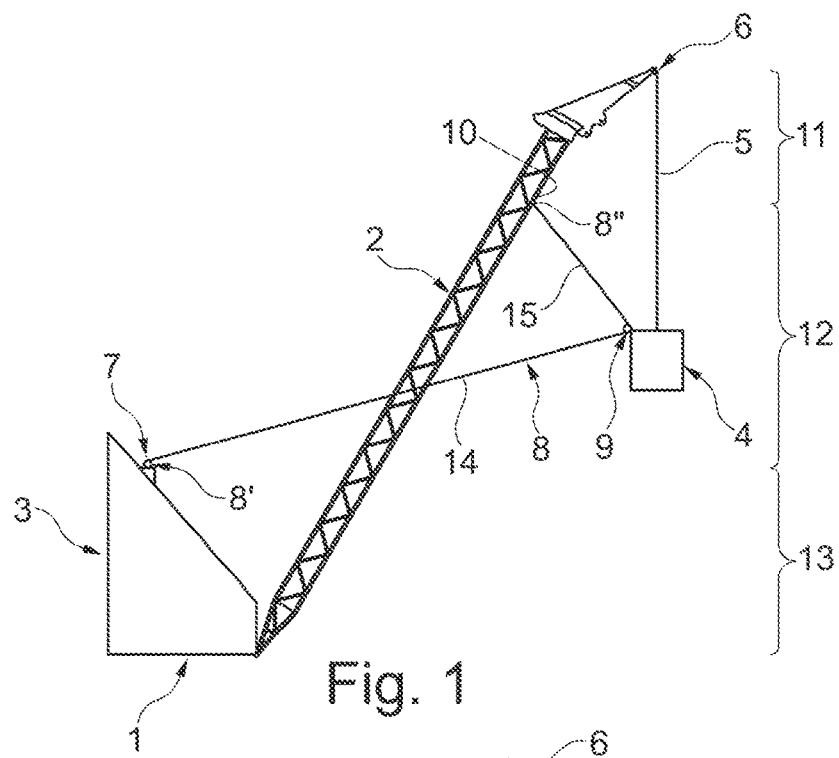
FIG. 1 shows a schematic view of a combination according to embodiments of the present invention comprising a crane and a crane boom provided with a load guiding arrangement.

FIG. 1 illustrates schematically a crane 1 provided with a crane boom 2 and a crane counterweight 3. A load 4 is suspended in the crane boom 2 from a bearing wire 5 running from a top 6 of the crane boom.

A guiding arrangement comprises two winches 7 each attached to the counterweight 3, two taglines 8, two redirection means 9 connected with the load 4 and two attachment brackets 10 attached to the crane boom 2 in a top zone 11 of the crane boom. The crane boom furthermore has a mid-zone 12 and a lower zone 13. Each of these three zones may constitute approximately ⅓ of the height of the crane boom.

The tagline 8 comprises a lower part 14 arranged between the winch 7 and the redirection means 9 and an upper part 15 arranged between the redirection means 9 and the attachment bracket 10.

Accordingly, the tagline 8 has a first end 8' which is attached to the winch 7 and a second end 8" which is attached to the attachment bracket 10.

In FIG. 1 only one tagline, one winch, one redirection means, and one attachment bracket is shown. However, the load guiding arrangement will comprise two of each of these elements which are arranged with a mutual distance as explained below.

Figure 2:
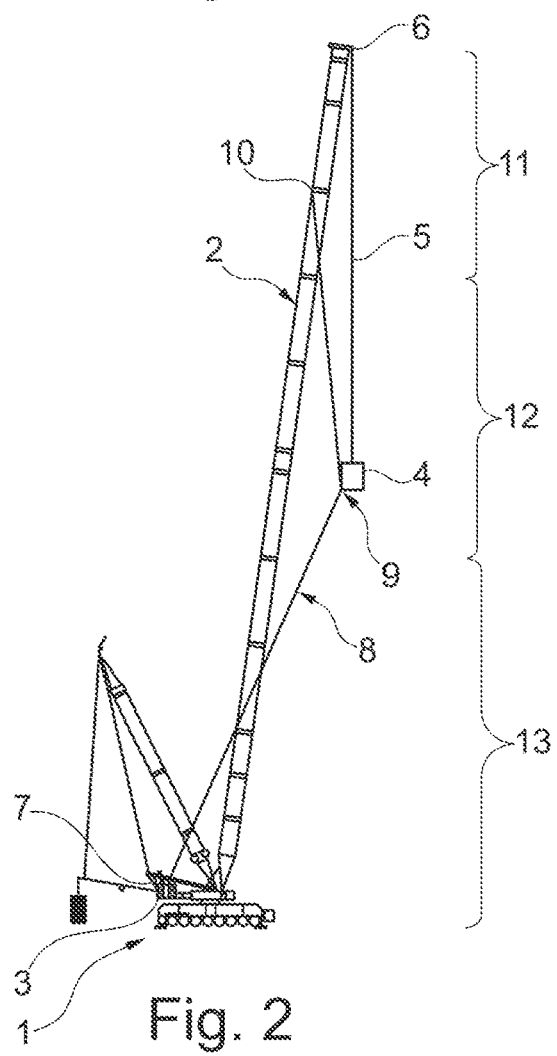
FIG. 2 illustrates a schematic view of a crane provided with a load guiding arrangement and illustrating a top zone, a mid-zone and a lower zone for the crane boom.

FIG. 2 illustrates with more detail the crane 1 and illustrates a situation where the load 4 is arranged in the mid zone 12 of the crane boom.

Figure 3:
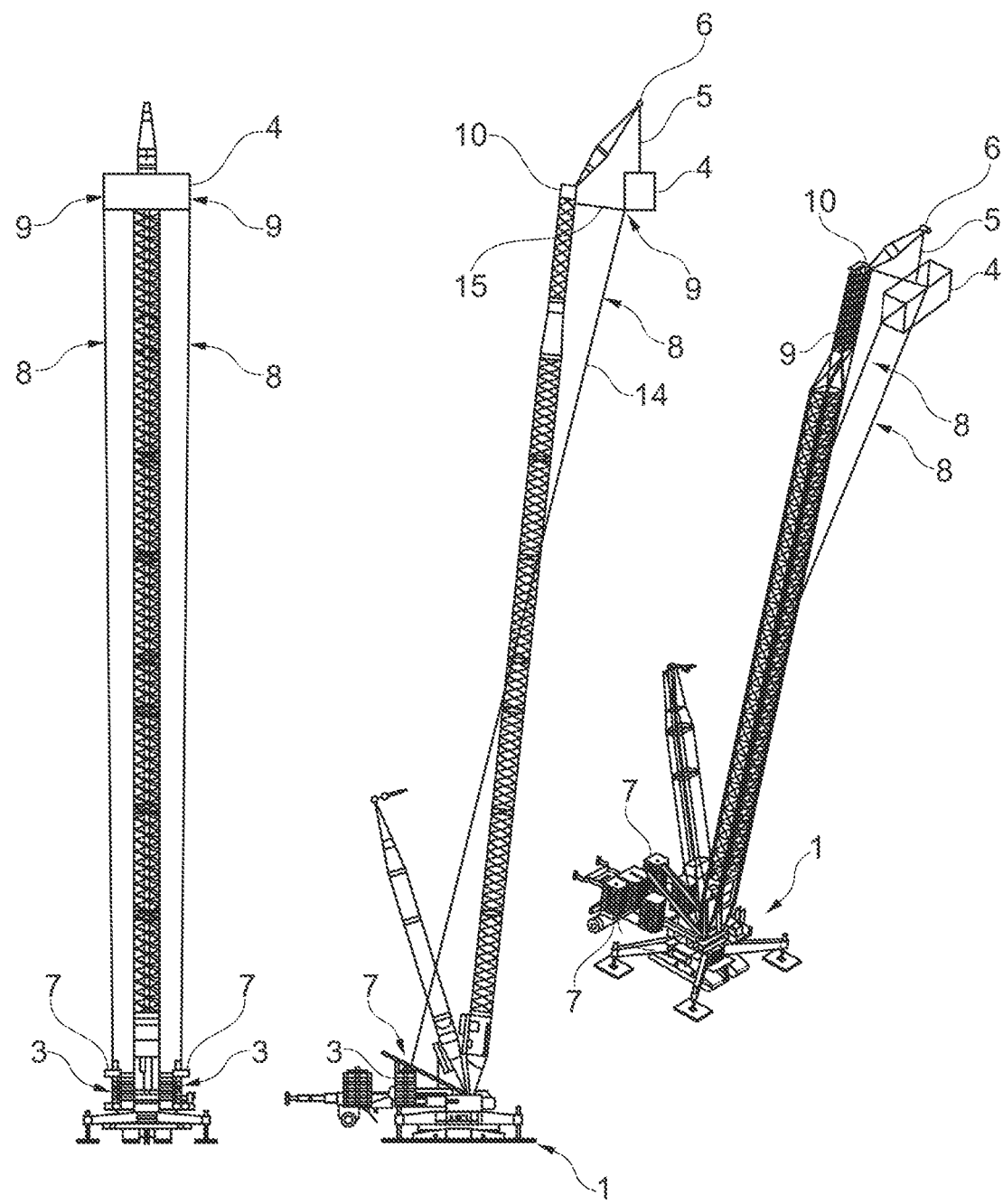
FIG. 3 illustrates different views of a combination according to embodiments of the present invention comprising a crane and a load guiding arrangement and with a load arranged at the top zone of the crane boom.

FIG. 3 illustrates a view seen from the front, from the side and a perspective view of a crane 1 with a guiding arrangement and with a load 4 arranged in the top zone at the top of the crane boom 2. Each attachment bracket 10 is arranged in an attachment position which substantially is provided at a height corresponding to the height of the position of the load 4.

The situation illustrated in FIG. 3 is a typical situation where the load arranged in the top zone is in a position where main control is needed. Especially for blade installations in wind turbines main control is needed at the height of a hub for the wind turbine (not illustrated).

It occurs from FIG. 3 that the upper part 15 of the taglines 8 is substantially horizontal and the lower part 14 of the taglines is substantially vertical. Therefore, the forces of the upper part 15 of the taglines will give the best control of the load 4. However, also a control in a vertical direction is established due to the effect of the lower part 14 of the taglines. Thus, it is possible to have a secure control of the load 4 which is suspended in the bearing wire 5 and is able to rotate around the bearing wire 5.

The control in the horizontal plane is the most important whereas the control for a pivoting in a vertical plane is less important. Accordingly, it is important to have the main control in the vertical plane which is obtained when the upper part 15 of the taglines 8 is substantially horizontal.

Figure 4:
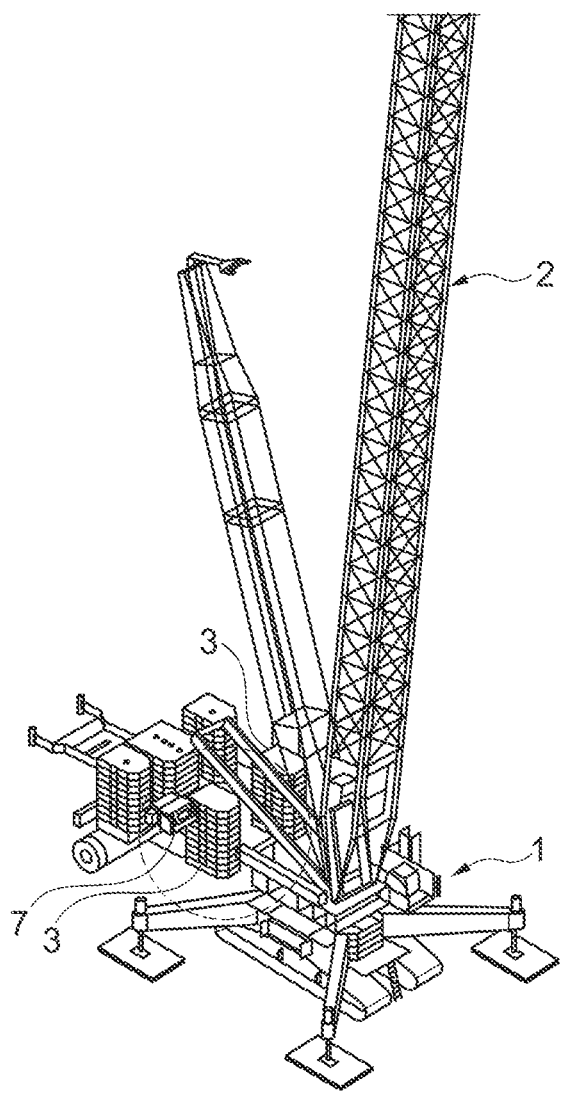
FIG. 4 illustrates a schematically partial view of the crane with a part of the crane boom for the illustration of the mounting of the winch.
Figure 5:
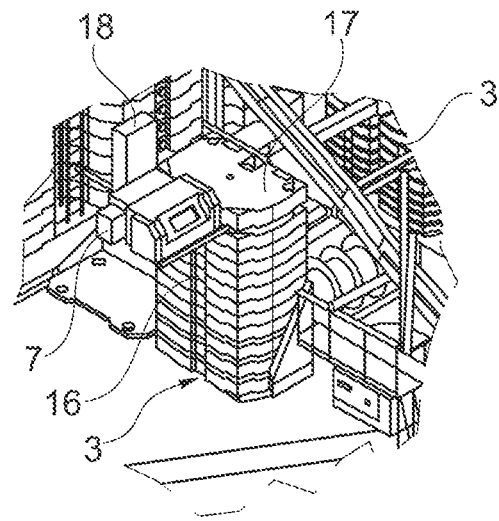
FIG. 5 illustrates an enlarged partial view from FIG. 4 to illustrate more clearly the mounting of the winch.

FIGS. 4 and 5 show in more detail the placement of the winch 7 at the counterweight 3. The winch 7 is mounted on a winch plate 16. The winch plate 16 is embodied and arranged for a mounting directly in the counterweight 3.

As it seen a counterweight block 17 is arranged on the top of the winch plate 16. Accordingly, there need no specific arrangement for attaching the winch to the crane and the winch mounted on the winch plate 16 is mounted to the crane simultaneously with the stack of counterweight blocks 17.

As it occurs from FIGS. 4 and 5 a winch 7 is arranged on each side of the crane even though only one of the winches 7 is visible in FIGS. 4 and 5.

In FIG. 5 a control box 18 is visible which is used for automatic controlling the taglines based on tension sensors or other sensors giving a signal to the control box 18 which calculates the necessary rotation of the motors being a part of the winches 7 in order to rotate the rotational spool of the winches.

Alternatively, the rotation of the winch 7 may be controlled manually by an operator.

Figure 6:
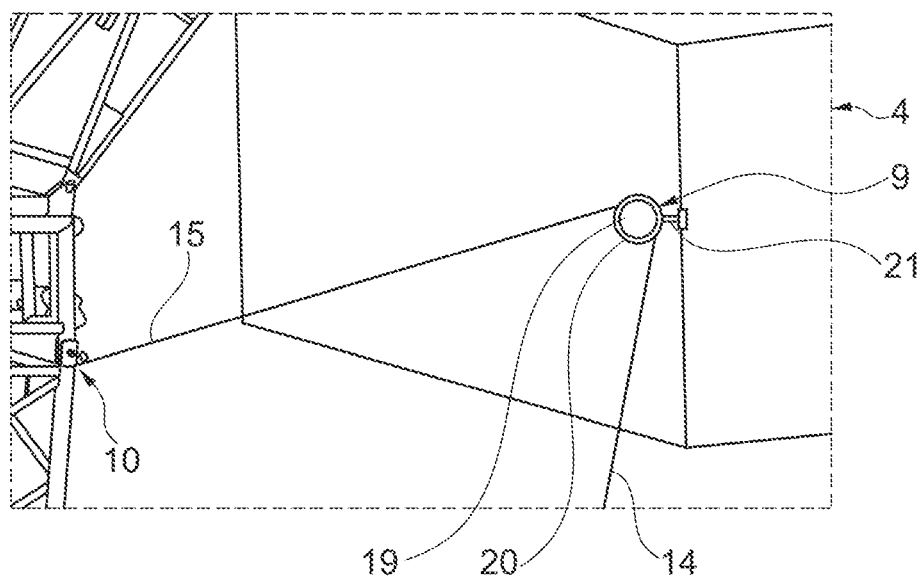
FIG. 6 shows a partial view of the load in a position at the top zone illustrating the connection of the tag wire to the load and to the top of the crane boom.

FIG. 6 illustrates the connection of the redirection means 9 to the load 4. The redirection means 9 are provided in the form of a snatch block 19 comprising a rotatable wheel 20 attached in a mounting frame 21 which is fixed to the load 4.

Figure 7:
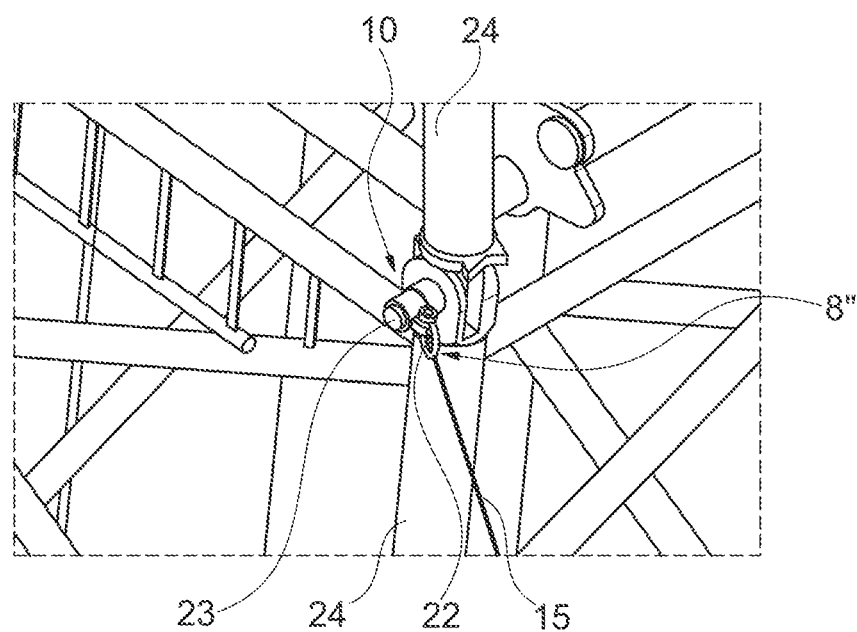
FIG. 7 illustrates an enlarged partial view of FIG. 6 for illustrating the position of the attachment brackets at the crane boom.

FIG. 7 illustrates more clearly the attachment bracket 10. The attachment bracket 10 comprises a connection eye 22 for attachment of the second end 8" of the tagline 8. The attachment bracket is connected with a boom pin 23 which is connecting the different parts of the lattice of the crane boom. As it is seen the crane boom comprises a number of tubes 24 constituting a lattice.

Instead of using the boom pin 23 it is possible to use a clamp comprising two clamp parts which are clamped onto a tube 24 of the lattice. Any clamp used in crane boom may be used for attaching the attachment bracket 10 to the crane boom 2.

Figure 8:
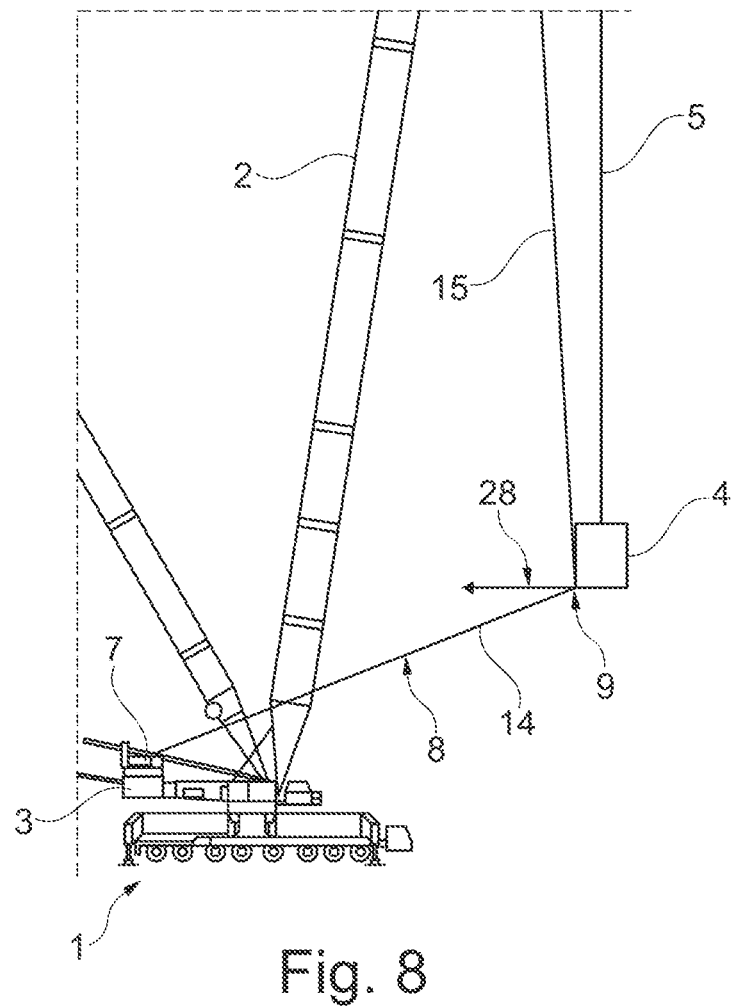
FIG. 8 shows a partial side view for illustration of forces stabilising the load against rotation in a lower zone.
Figure 9:
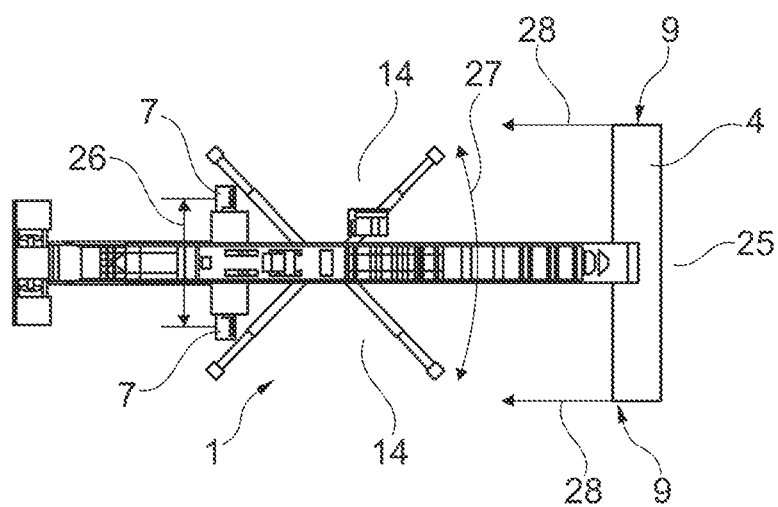
FIG. 9 shows a top view of the situation illustrated in FIG. 8.

FIGS. 8 and 9 illustrate the stabilisation of the load against rotation when the load 4 is in the lower zone 13. The redirection means 9 are arranged with a mutual distance 25 which may e.g., be 20 m. The winches 7 are arranged with a mutual distance 26 which may e.g., be 12 m. Hereby an angle 27 is formed between the two lower parts of the taglines which is in the size of 20-24°.

As it is especially clear from FIG. 8 the lower part 14 of the taglines is substantially horizontal. Accordingly, a force 28 is mainly directed in horizontal plane and has an action on the load 4 at each of the redirection means 9. Hereby the control in horizontal plane is very efficient against rotation.

A minor force in vertical direction is also provided, seeing that the lower part 14 of the tagline has an oblique orientation in relation to a horizontal plane.

Figure 10:
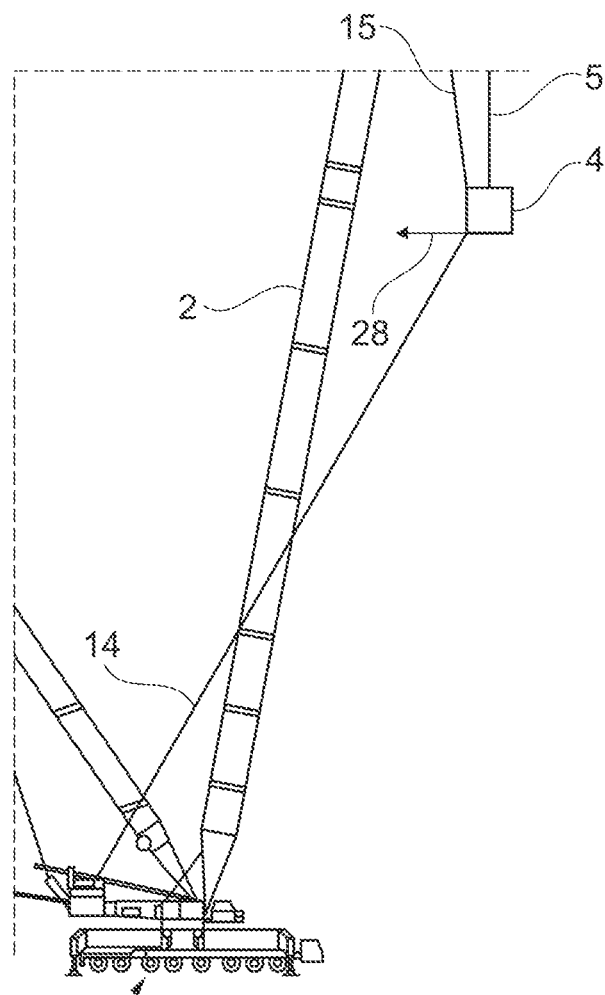
FIG. 10 shows a partial side view for illustration of forces stabilising the load against rotation in a mid-zone.
Figure 11:
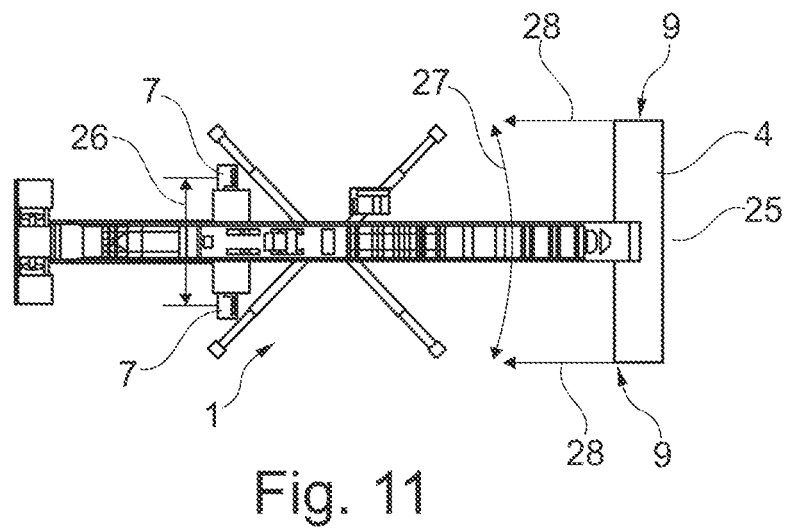
FIG. 11 shows a top view of the situation illustrated in FIG. 10.

FIGS. 10 and 11 illustrate the stabilizing forces in the mid zone 12. Also, here it is seen that the angle 27 will be in the same magnitude as explained in connection with FIGS. 8 and 9. Moreover, it is also seen that the force 28 will mainly be in horizontal plane in order to stabilise the load against rotation around the bearing wire 5.

Due to the angles the stabilising forces in the mid zone 12 are not as powerful as the forces at the lower zone and the top zone. However, it is typically at the top zone where the most powerful and most secure control against rotation is necessary.

Figure 12:
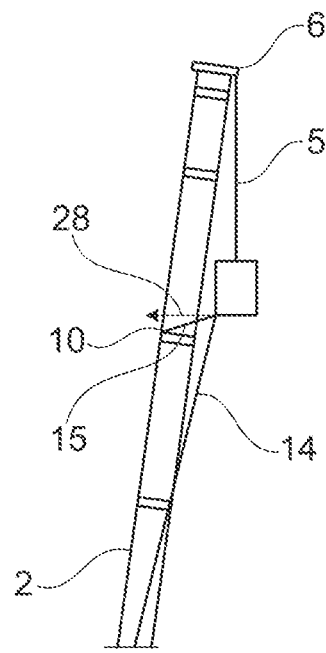
FIG. 12 shows a partial side view for illustration of forces stabilising the load against rotation in a top zone.
Figure 13:
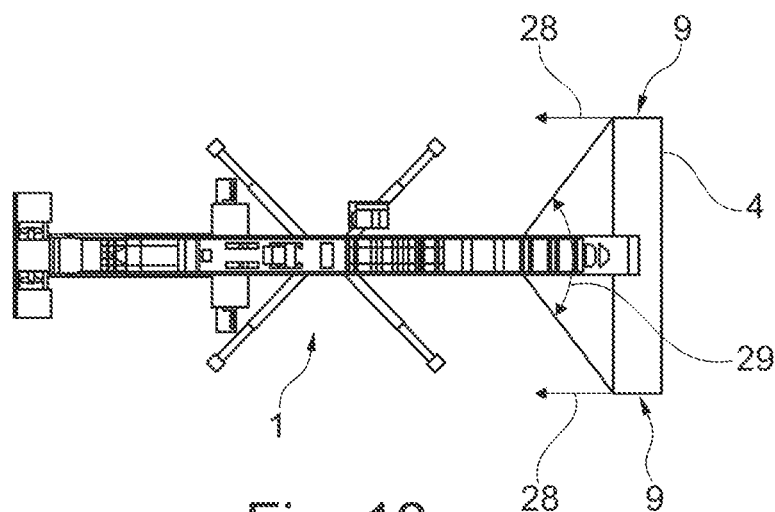
FIG. 13 shows a top view of the situation illustrated in FIG. 12.

FIGS. 12 and 13 correspond to FIGS. 8 and 9 and FIGS. 10 and 11, respectively, however, illustrating the stabilisation of the load in the top zone 11.

Here it is seen that the upper part 15 of the taglines is arranged above the attachment brackets 10 attached to the crane boom 2.

Accordingly, the load 4 is here in a position between the position of the attachment bracket 10 and the top 6 of the crane boom.

The forces 28 in a horizontal direction will be very important in direction towards the crane boom. In general, the angle 29 between the two upper parts 14 of the taglines will vary between 90° to 30°. The deviation of the angle of the upper part 14 in relation to a horizontal plane will be very limited, typically less than 30°. Accordingly, a high force 28 acting in horizontal plane is obtained. This ensures a very good stabilisation of the load against rotation in the horizontal plane around the bearing wire 5.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A combination comprising a crane and a load guiding arrangement arranged for mounting to the crane, which crane comprises a crane boom and which load guiding arrangement is arranged for controlling the orientation of a load suspended in a crane boom from a bearing wire about the bearing wire, which combination comprises:
    two winches, each of the winches has a bi-directional rotational spool, wherein the winches are placed on the crane;
    two taglines with a first end of the tagline attached to the spool, wherein each tagline is connected to the load for applying a controlled torque to the load about the bearing wire;
    two attachment brackets attached to the crane boom in an attachment position in a top zone of the crane boom, each attachment bracket is arranged for attachment to a second end of the tagline; and
    two tagline redirection devices,
    wherein the redirection devices allow the tagline to roll or slide around the redirection devices while the load is raised or lowered and simultaneously provides for a redirection of the tagline, whereby
    each tagline is connected with the load through the redirection devices so that each tagline extend from the spool to the attachment bracket via the redirection devices, wherein the combination furthermore comprises:
    a crane counterweight; and
    for each winch, a winch frame, which is mounted directly on the crane next to or on the crane counterweight in positions at each side of the crane,
    wherein each winch frame is configured with a form corresponding the form of counterweight blocks and is attached to the crane counterweight in a position between the counterweight blocks.

2. The combination according to claim 1, wherein each attachment bracket comprises an attachment clamp which is mounted directly to the crane boom by clamping two clamp parts onto a crane boom lattice part.

3. The combination according to claim 1, wherein the attachment brackets are mounted at opposite ends of a traverse which is attached to the crane boom.

4. The combination according to claim 1, wherein the tagline redirection devices are chosen between snatch blocks, connection eyes, shaft connections, or roll connections allowing the tagline to roll or slide around the redirection devices during raising or lowering the load.

5. The combination according to claim 1, wherein the attachment position is arranged at a position lower than a top position of the crane boom whereby the load may be raised to a position above the attachment position.

6. The combination according to claim 1, wherein the combination furthermore comprises a yoke for supporting the load and that the two tagline redirection devices are connected with the load via the yoke.

7. The combination according to claim 1, wherein the mutual distance between the two tagline redirection devices is larger than a mutual distance between the two winches.

8. The combination according to claim 7, wherein the mutual distance between the two tagline redirection devices is between 8 and 20 m and that the mutual distance between the two winches is between 4 and 12 m.

9. The combination according to claim 1, wherein the combination comprises a control system and wherein the winches are controlled by the control system.

10. Use of a load guiding arrangement
    wherein the load guiding arrangement is arranged for mounting to a crane, which crane comprises a crane boom and which load guiding arrangement is arranged for controlling the orientation of a load suspended in the crane boom from a bearing wire about the bearing wire, and
    wherein the load guiding arrangement comprises:
    two winches, each of the winches has a bi-directional rotational spool, wherein the winches are placed on the crane;
    two taglines with a first end of the tagline attached to the spool, wherein each tagline is connected to the load for applying a controlled torque to the load about the bearing wire,
    two attachment brackets attached to the crane boom in an attachment position in a top zone of the crane boom at a position lower than a top position of the crane boom whereby the load may be raised to a position above the attachment position, wherein each attachment bracket is arranged for attachment to a second end of the tagline; and
    two tagline redirection devices,
    wherein the redirection devices allow the tagline to roll or slide around the redirection devices while the load is raised or lowered and simultaneously provides for a redirection of the tagline, whereby
    each tagline is connected with the load through the redirection devices so that each tagline extend from the spool to the attachment bracket via the redirection devices,
    for each winch, a winch frame, which is arranged for mounting directly on the crane next to or on the crane counterweight in positions at each side of the crane, wherein each winch frame is configured with a form corresponding the form of counterweight blocks and is attached to a crane counterweight in a position between the counterweight blocks.

* * * * *